(12) United States Patent
Heiss et al.

(10) Patent No.: US 7,145,907 B1
(45) Date of Patent: Dec. 5, 2006

(54) METHOD FOR REMOVING ATM CELLS FROM AN ATM COMMUNICATIONS DEVICE

(75) Inventors: Herbert Heiss, Unterhaching (DE); Raimar Thudt, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/623,775

(22) PCT Filed: Mar. 8, 1999

(86) PCT No.: PCT/DE99/00613

§ 371 (c)(1),
(2), (4) Date: Sep. 8, 2000

(87) PCT Pub. No.: WO99/46952

PCT Pub. Date: Sep. 16, 1999

(30) Foreign Application Priority Data

Mar. 9, 1998 (DE) ................. 198 10 058

(51) Int. Cl.
*H04L 12/56* (2006.01)
*H04L 12/28* (2006.01)
*H04L 12/26* (2006.01)

(52) U.S. Cl. ............... 370/395.1; 370/236.1; 370/236.2; 370/412

(58) Field of Classification Search ............ 370/229, 370/230, 235, 412
See application file for complete search history.

(56) References Cited

U.S. PATENT DOCUMENTS

| | | | | |
|---|---|---|---|---|
| 5,404,354 A | * | 4/1995 | Hayter et al. | ............... 370/230 |
| 5,426,640 A | | 6/1995 | Hluchyj et al. | |
| 5,764,641 A | * | 6/1998 | Lin | ............... 370/412 |
| 5,822,540 A | * | 10/1998 | Caldara et al. | ............... 709/236 |
| 6,049,527 A | * | 4/2000 | Isoyama et al. | ............... 370/235 |
| 6,151,299 A | * | 11/2000 | Lyon et al. | ............... 370/229 |
| 6,282,171 B1 | * | 8/2001 | Adams et al. | ............... 370/229 |
| 6,345,037 B1 | * | 2/2002 | St-Denis et al. | ............... 370/230 |
| 6,512,747 B1 | * | 1/2003 | Umeuchi et al. | ........ 370/310.1 |

FOREIGN PATENT DOCUMENTS

EP 0 596 200 A2 5/1994

OTHER PUBLICATIONS

Li et al., "Performance of TCP over UBR service in ATM Networks with Per-VC Early Packet Discard Scheme", XP 000594803, pp. 350-357.
Romanow et al., "Dynamics of TCP Traffic over ATM Networks", IEEE Journal on Selected Areas in Communications, vol. 13, No. 4, May 1995, pp. 633-641.
Armitage et al., "Packet Reassembly During Cell Loss", IEEE Network, Sep. 1993, pp. 26-34.
ATM standards, "Basic Principles of ATM", Chapter 3, pp. 104-116.

* cited by examiner

*Primary Examiner*—Huy D. Vu
*Assistant Examiner*—Clemence Han
(74) *Attorney, Agent, or Firm*—Fish & Richardson P.C.

(57) ABSTRACT

A method for removal of ATM cells (2, 6) from an ATM communications device wherein ATM cells (2, 3, 5, 6) are respectively allocated in pluralities to a common frame (8, 9), whereby all ATM cells (2 . . . 6) of a frame (9) whose first ATM cell (2) is in the waiting list (1) are removed from a waiting list (1) for the administration of a sequence of ATM cells (2, 3, 4, 5, 6). The method makes it possible to quickly and efficiently create space for cells having a higher priority in the ATM communications device.

8 Claims, 2 Drawing Sheets

METHOD FOR REMOVING ATM CELLS FROM AN ATM COMMUNICATIONS DEVICE

BACKGROUND OF THE INVENTION

1. Field of the Invention

The present invention is directed to a method for the removal of ATM cells from an ATM communications device in which a respective plurality of ATM cells are allocated to a common frame

2. Description of the Related Art

In a traditional packet communication system, a packet has a comparatively great and variable length. A system for the transmission of information in packets having fixed, predetermined lengths is referred to as an ATM (asynchronous transfer mode) system. Voice, video and data signals can be processed and transmitted in the same way with such a system. The individual packets are usually called cells. A cell header, whose information enables a switching or, respectively, allocation of the respective cell is respectively contained in the cells. A high-speed and broadband transmission with a transmission rate of more than 150 Mb/s is possible in ATM communication devices, particularly communication network devices.

In particular, the ATM cells have a length of 53 bytes for a broadband ISDN (Integrated Services Digital Network). The publication by M. DePrycker, "Asynchronous Transfer Mode", $2^{nd}$ Edition, London, Horwood, 1993, is referenced for further details about the structure of ATM cells.

One problem given ATM communication devices is the height of the transmission rate on a transmission link of the device when a back-up of ATM cells has formed at the transmission link. The problem is described in greater detail in the publication IEEE Journal on Selected Areas in Communications, Vol. 13, No. 4, May 1995, pages 633 through 641, "Dynamics of TCP Traffic over ATM Networks" by Allyn Romanow and Sally Floyd (referred to as IEEE 95 below). The article is concerned with ATM systems wherein a respective plurality of ATM cells are allocated to a common frame. When, for example, a cell of such a frame has been lost or damaged, it is undesirable that the further cells of the same frame are transmitted via a transmission link of an ATM device since the complete information of the frame would no longer arrive at the end of the transmission link. The ATM system would be unnecessarily burdened. Particularly given a back-up on the transmission link, it is therefore important to remove the further cells of the frame as, quickly and effectively as possible.

It is therefore proposed in the publication IEEE Network Mag., Vol. 7, No. 5, pages 26 through 34, September 1993, "Packet Reassembly during Cell Loss" by G. Armitage and K. Adams (referred to below as IEEE 93) to remove ATM cells of a specific frame at the respective arrival of an individual ATM cell at the end of a waiting list. In particular, such waiting lists serve for the administration of a sequence of ATM cells at the end and/or at the start of a transmission link. According to the method described in the IEEE 93 publication, which is referred to as partial packet discard (PPD below), the first and—when present—further cells of the frame that are already in the waiting list are not removed; rather, only all newly arriving cells of the frame are removed, with the exception of the last cell of the frame. PPD has the disadvantage that at least the first and the last cell continue to remain in the waiting list.

Waiting lists are usually organized according to the FIFO principle, in accordance wherewith the cell that arrived at the waiting list before another cell also in turn leaves it first. Under certain circumstances, however, the cells are divided into at least two priority classes, whereby cells of a higher priority are handled on a privileged basis.

The IEEE 95 publication discloses another method according to which all cells of a frame, from the first to the last cell are removed from the ATM communication device upon arrival at a waiting list. This method, called early packet discard (EPD below) has the advantage that no residual cells of a damaged frame or of a frame to be removed for other reasons remain, and, thus, the maximally possible space is available for other ATM cells. EPD, however, cannot be applied to frames whose first cell has already been added to the waiting list.

SUMMARY OF THE INVENTION

The present invention is based on the object of specifying providing a method for the removal of ATM cells from an ATM communications device wherein a respective plurality of ATM cells are allocated to a common frame, whereby ATM cells of a specific frame can be removed from the ATM communications device in an optimally short time and in an optimally great plurality of conditions of a waiting list.

This object is achieved by a method for removing ATM cells from an ATM communications device wherein ATM cells are respectively allocated in pluralities to a common frame, all ATM cells of a frame whose first ATM cell is in the waiting list being removed from a waiting list for the administration of a sequence of ATM cells, including the steps of: a frame start identifier is stored that identifies the ATM cell in the waiting list that immediately precedes the first ATM cell of the frame; and the frame start identifier is called before the removal of the ATM cell or, respectively, of the ATM cells of the frame.

In the preferred method, the frame is the frame beginning farthest toward the back in the waiting list. In one embodiment, following ATM cells of the frame up to and including the last ATM cell of the frame are removed upon arrival or following arrival at the waiting list. When the first ATM cell of the frame is immediately preceded by a last ATM cell of a different frame, the frame start identifier references this ATM cell. Alternatively, when the first ATM cell of the frame is immediately preceded by an individual ATM cell not allocated to a frame, particularly an OAM cell or a RM cell, the frame start identifier references this ATM cell. When the fist ATM cell of the frame is followed in the waiting list by an individual ATM cell not allocated to any frame, particularly an OAM cell or ARM cell, a predetermined inhibit value is stored instead of the frame start identifier, so that the ATM cells of the frame cannot be removed from the waiting list. The inhibit value is stored upon arrival of the individual ATM cell at the waiting list and/or when this cell is added to the waiting list according to one development. Preferably, a check is carried out at or following the attaching of an arrived ATM cell to the end of the waiting list to see whether the ATM cell is a matter of a last cell of a frame; and, as warranted, a value that references this ATM cell is stored as the frame start identifier, so that the ATM cells of the appertaining frame cannot be removed from the waiting list.

What is understood by the term "waiting list" in this specification is any administration unit for the administration of a plurality of ATM cells in which a one-dimensional logical chaining of the plurality of ATM cells is formed or can be produced. Waiting lists that are organized according to the FIFO principle are particularly included here.

In the inventive method for the removal of ATM cells, all ATM cells of a frame whose first ATM cell is located in the waiting list are removed from a waiting list for the administration of a sequence of ATM cells. The greatest possible space in the waiting list is thus created given removal of the ATM cells of the frame. Over and above this, it is possible to remove all ATM cells of the frame simultaneously or immediately successively from the waiting list, so that the cells can be removed in the shortest possible time. In particular, it is not necessary to thereby wait for the arrival of ATM cells at the waiting list. The method can also be applied given a plurality of conditions of the waiting list, namely whenever the first ATM cell of a frame is in the waiting list. Given developments of the method, the application of the method can, however, be made dependent on meeting additional conditions.

When, for example, the waiting list is realized with a pointer chain, the deletion or, respectively, removal of the ATM cells can be realized simply by parting the pointer chain and by releasing the corresponding memory space in a data store. As known, the pointer chain can be produced and administered with a computer program or with hardware, particularly upon utilization of the information at defined locations in hardware data store areas for accepting ATM cell information.

In a development of the method, the frame whose ATM cells are removed is the frame that begins farthest toward the back in the waiting list. Upon removal of the ATM cells of the frame, it is particularly the first ATM cell thereof that is identified, and this ATM cell as well—when present—all following ATM cells of the frame located in the waiting list are removed.

Preferably, following ATM cells of the frame are removed at or following arrival at the waiting list up to and including the last ATM cell of the frame. What this prevents is that the ATM cells of the frame arriving later unnecessarily burden the ATM communications device. The removal of the following ATM cells is the same as the removal of ATM cells according to EPD insofar as the removal of the individual cells is triggered by their arrival at the waiting list.

A frame start identifier is preferably stored that references the ATM cell in the waiting list immediately preceding the first ATM cell of the frame, and the frame start identifier is called before the removal of the ATM cell or, respectively, of the ATM cells of the frame. This procedure has the advantage that the information usually present in ATM systems regarding which cell is the last cell of a frame can be utilized. This information is usually present in the cell header of the last cell of the frame, namely in what is referred to as the AAU bit in the cell type field (payload-type field) of the cell header as a rule.

In particular, the presence of this information is respectively checked at or before the adding of a newly arrived ATM cell to the end of the waiting list. As warranted, a value is then stored as a frame start identifier that identifies this ATM cell, so that the ATM cells of the appertaining frame cannot be removed from the waiting list since—at least in this status of the waiting list—no first ATM cell of a following frame is present in the waiting list after the last ATM cell of the frame that has just arrived. As soon as such a first ATM cell of a following frame has arrived, a removal of ATM cells of the following frame is possible.

In particular, the above-described measure serves the purpose of protecting individual ATM cells not allocated to any frame, particularly OAM cells (operation, administration, maintenance) or RL cells (resource management) in a development of the method. OAM cells generally serve for administration and maintenance; RM cells serve for flow control. Such individual cells should often not be removed from the ATM communications device. When such an individual ATM cell immediately precedes the first ATM cell of the frame that is the only frame beginning in the waiting list or is the frame that begins farthest toward the back in the waiting list, a value that references this individual ATM cell is therefore preferably stored as the frame start identifier. Consequently, this individual cell is protected from being removed because, in this development of the method, only following cells in the waiting list can be removed.

When a last ATM cell of another frame immediately precedes the first ATM cell of the frame that is the frame beginning farthest toward the back in the waiting list, the frame start identifier preferably references this ATM cell.

Another possibility of protecting individual ATM cells not allocated to any frame is realized in a development. In this development, a predetermined block value is stored instead of the start identifier when the first ATM cell of the frame whose ATM cells come into consideration for removal from the waiting list is followed by such an individual ATM cell. The block value is preferably stored upon arrival of the individual ATM cell at the waiting list and/or when this cell is added to the waiting list. The cell is thus immediately protected after it arrives or, respectively, is added.

BRIEF DESCRIPTION OF THE DRAWINGS

The invention is now described in greater detail on the basis of exemplary embodiments. However, it is not limited to these exemplary embodiments.

DETAILED DESCRIPTION OF THE PREFERRED EMBODIMENTS

Figure 1:
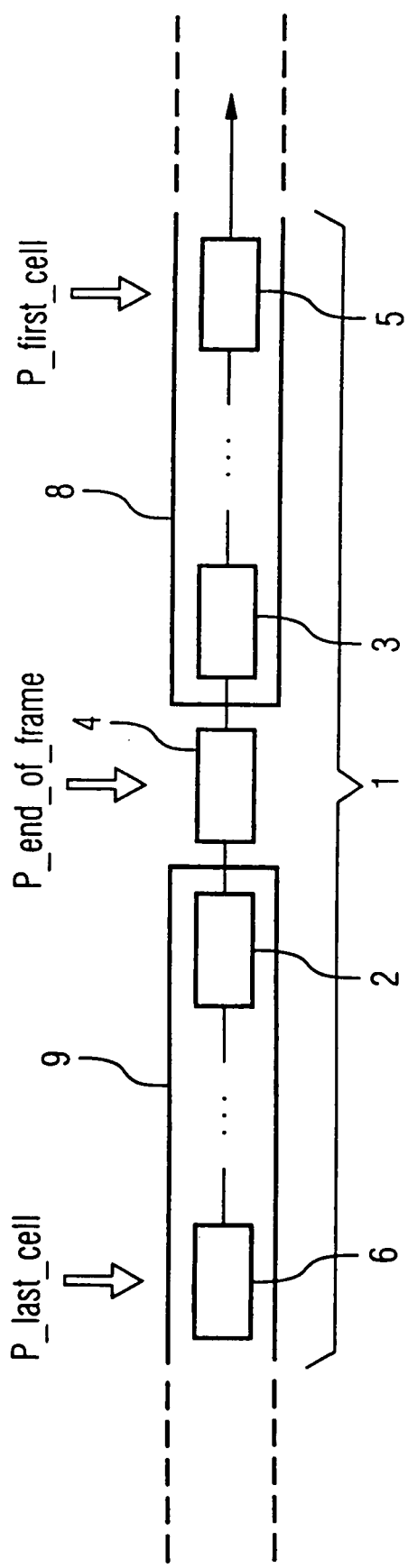
FIG. 1 is a diagram of a waiting list for the administration of a sequence of ATM cells.

FIG. 1 shows a waiting list 1 in which ATM cells 2, 3, 4, 5, 6 are arranged in a specific sequence. The ATM cells are thereby partially allocated to two different frames 8 and 9, whereby further ATM cells of the frame 8 have already left the waiting list 1 in the direction of the arrow toward the right, and further ATM cells of the frame 9 have not yet arrived at the waiting list 1 (coming from the left). The first waiting list cell 5 is therefore not the first cell of the frame 8. The last frame cell 3 of the frame 8, which carries a corresponding frame end identifier in its cell header, is in the waiting list 1. This last frame cell 3 is immediately followed by an OAM cell that is an individual cell not allocated to any frame. The OAM cell 4 is immediately followed by the first frame cell 2 of the frame 9. Further ATM cells of the frame 9 follow. One of these ATM cells is the last waiting list cell 6 of the waiting list 1.

Variables, particularly pointers, are provided for marking specific cells 4, 5 and, 6 in the waiting list 1, particularly with a computer program for the administration of the cells in the waiting list 1. The variable P_first_cell thereby references the first waiting list cell 5 of the waiting list 1. When the waiting list 1 is empty, then a predetermined value is stored in the variable, referred to as "invalid" below, which means that no valid entry is present. A value that references the last ATM cell that is a last frame cell in the waiting list 1 is stored in the variable P_end_of_frame. When such a last frame cell is followed, for example as in FIG. 1, by the ATM cell 4, an individual cell not allocated to any frame, the OAM cell 4 in the example of FIG. 1, then the identifier of the last cell, i.e. the individual cell located farthest toward the back of the waiting list 1, is stored in the P_end_of_frame. In the example of FIG. 1, only one such cell is present, so that P_end_of_frame contains the identifier of the OAM cell 4.

Figure 2:
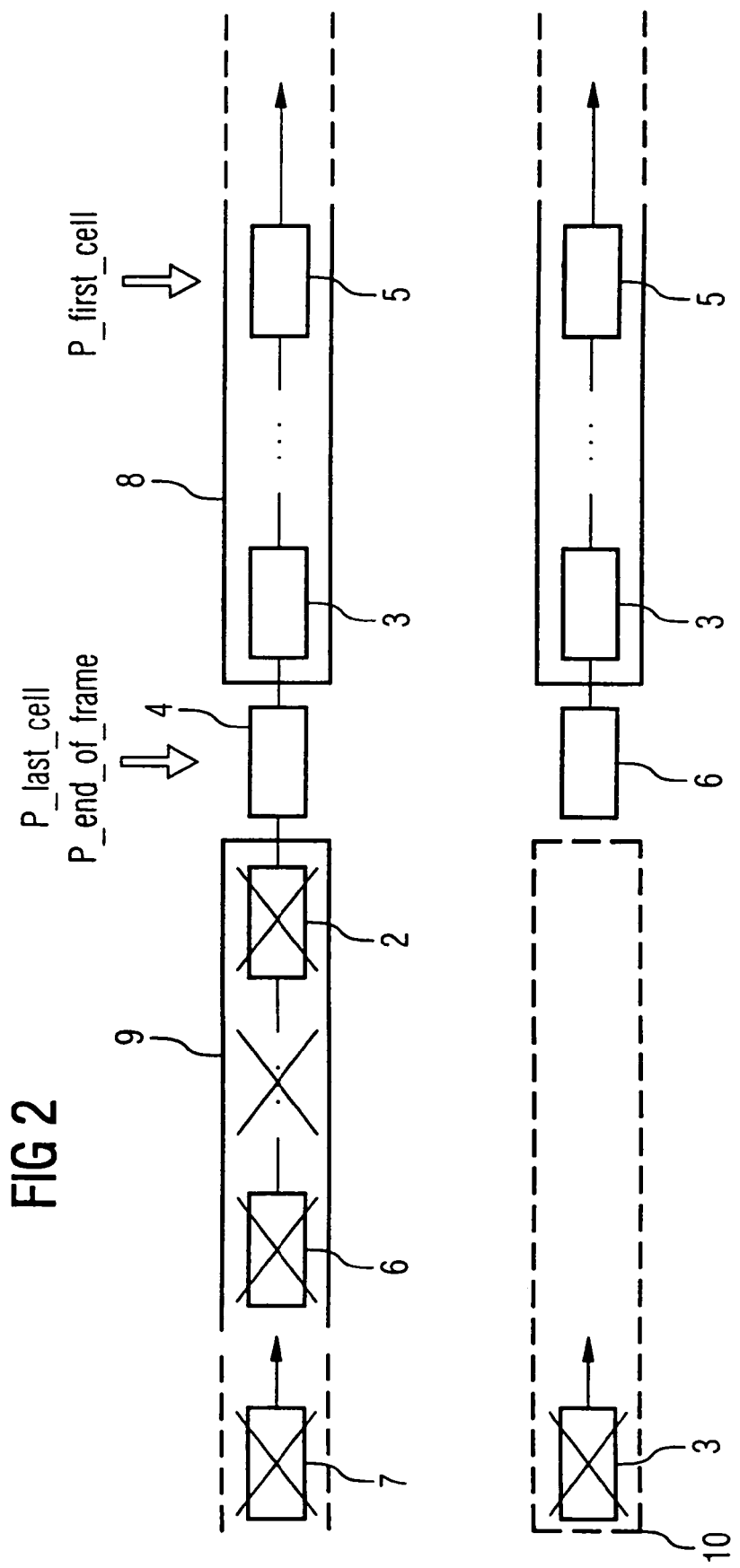
FIG. 2 is a diagram of the procedure of removing ATM cells proceeding from the status of a waiting list shown in FIG. 1.

When space is then to be created in the ATM system, particularly for ATM cells having a higher priority, then, as shown in FIG. 2, all cells of the frame 9 that are already in the waiting list 1 are initially removed from the waiting list. To that end, the value of the cell that is already entered in the variable P end of_frame is preferably entered in the variable P_last_cell. In the example of FIG. 2, this is the OAM cell 4. Further, the value TRUE is preferably entered in a variable LPD_flag. In order to enable a querie as to whether the procedure of the removal of ATM cells is activated. LPD is the abbreviation for last packet discard, which means that the last frame in the waiting list is removed.

Following ATM cells 7 of the frame 9 are then removed at or after the arrival at the waiting list 1. The status shown in the upper part of FIG. 2 has thus been reached. The further, following ATM cells of the frame 9 up to the frame end 10, i.e. up to the last ATM cell 3 of the frame 9, are removed at or following the arrival at the waiting list 1. The status of the waiting list 1 shown in the lower part of FIG. 2 has thus been reached.

An exemplary embodiment of the invention is now described below on the basis of parts of a computer program for administering a sequence of ATM cells in a waiting list. Such computer programs are also employed in the known methods of early packet discard (EPD) and partial packet discard (PPD). Routines of the computer program described below, however, partially differs significantly from the known computer programs.

The following assumptions are made: ATM cells arrive at a waiting list. Some of these cells as well as cells that are already classified in the waiting list are to be removed. The remaining cells leave the waiting list in the meantime or later. The ATM cells are at least partially organized in frames, i.e. successive ATM cells from a first frame cell up to a last frame cell belong to a common frame. No frame cells of a different frame are located between the first and the last frame cell. However, individual ATM cells not allocated to any frame can be arranged between the first frame cell and the last frame cell. That stated above applies both to the sequence in a waiting list as well as to the sequence of the transmission on a transmission link of an ATM communications device. The last ATM cell of a respective frame can be unambiguously identified. An unambiguous, one-dimensional chaining of the cells is produced in the waiting list for the administration of the ATM cells in the waiting list. The sequence is thus unambiguously defined. For locating specific cells in the waiting list, however, it would last too long if the search were always begun at the beginning or end of the waiting list and the cells had to be checked cell-by-cell in the waiting list. Following cells can therefore be directly located by storing an identifier in a variable:

the first cell in the waiting list (variable: P_first_cell)
the last cell in the waiting list (variable: P_last_cell)
the last cell in the waiting list that is a last frame cell or that is an individual cell not allocated to any frame and that is arranged between two frames (variable: P_end_of_frame).

The removal of ATM cells according to the LPD method is only implemented when the last frame cell of the waiting list is not the cell whose identifier is deposited in P_end_of_frame and when a valid cell identifier is entered in the variable P_end_of_frame, i.e. when a last frame cell or an individual cell following thereupon is still in the waiting list.

A plurality of waiting lists can be present in an ATM communications device, these being respectively administered according to the method described below. In this case, each waiting list has its own individual identifier, and variables for storing the aforementioned cells are present in each waiting list. For the sake of simplicity, it is assumed for the following program parts that only one waiting list is present.

First, individual operations shall be presented that can be implemented at the cells. It is assumed that each of the cells has an unambiguous identifier that is referenced P_cell. The operations are:

| | |
|---|---|
| next_cell (P_cell) | returns the identifier of the immediately following cell in the waiting list. |
| end_of_frame (P_cell) | returns the value TRUE when P_cell references a last frame cell and otherwise returns the value FALSE. |
| exclude_cell (P_cell) | returns the value TRUE for cells that are not to be removed, for example OAM cells |
| discard_cell (P_cell) | removes the cells with the identifier P_cell |
| decide_cell (P_cell) | determines on the basis of criteria that are not explained in detail here whether specific operations or procedures, particularly discard_cell or append_cell (see below) are to be carried out at the cell having the identifier P_cell. |

The following procedures or, respectively, functions (called procedures below) are explained in greater detail:

| | |
|---|---|
| arrive_cell (P_cell) | implements various operations at the cell having the identifier P_cell upon arrival at the waiting list. |
| queue_empty | returns the value TRUE when the waiting list is empty and otherwise returns the value FALSE. |
| append_cell (P_cell) | attaches the cell having the identifier P_cell to the end of the waiting list and implements various operations |
| extract_cell | serves for the removal of a cell at the start of the waiting list, particularly for the transmission of this cell onto a transmission link |
| remove_last_frame | removes all cells of the last frame of the waiting list from the waiting list, if possible. |

In order to enable an inquiry as to whether the removal of cells from the ATM communications device according to the method LPD is active, a boolean variable LPD_flag is provided.

In the initialization of the program, i.e. when the waiting list is empty, the three cell identifier variables P_first_cell, P_last_cell and P_end_of_frame are set to the value "invalid", and the variable LPD_flag is set to the value FALSE.

Cells that are not ordinary data cells and that do not belong to a frame can arrive at the waiting list. These individual cells, for example OAM cells or RM cells, can be excluded from removal from the ATM communications device or can be not excluded therefrom. Criteria that are not explained in greater detail here are available for this purpose in the ATM communication system. When one of these cells that is not to be removed is arranged within a first and a last frame cell, then the removal of the cells of the frame is not implemented according to the method LPD.

Procedure arrive_cell works according to the following algorithm in the exemplary program:

IF exclude_cell (P_cell)

THEN append_cell (P_cell)

ELSE IF LPD_flag=TRUE
    THEN IF end_of_frame (P_cell)
        THEN LPD_Flag=FALSE
        discard_cell (P_Cell)
    ELSE IF PPD_flag=TGRUE
        THEN IF end_of_frame (P_cell)
          PPD_flag=FALSE
        ELSE discard_cell (P_cell)
    ELSE decide_cell (P_cell)

In the procedure arrive_cell (P_cell), a check is first carried out to see whether the cell that has arrived is accepted in every case, i.e. is to be attached to the end of the waiting list. Otherwise, a check is carried out to see whether the removal of cells according to the method LPD is activated. If yes, then the cell is removed and the removal is disabled for following cells if the cell is the last frame cell. When LPD is not activated, then a check is carried out to see whether the method PPD (partial packet discard) known from the prior art is activated. PPD can lead to an unburdening of the ATM system in specific instances when LPD cannot be implemented. In PPD, only cells arriving at the waiting list are removed and no cells already in the waiting list are removed. When PPD is activated, then the cell that has arrived is removed if it is not a last frame cell. When it is a last frame cell, the procedure append_cell (P_cell) is called and PPD is subsequently deactivated. When PPD and LPD are not activated, the procedure decides_cell (P_cell) is called.

The procedure append_cell (P_cell) works according to the following algorithm in the exemplary program:

IF cell identified by P_cell is to be discarded for other reasons
    THEN discard_cell (P_cell)
    ELSE IF queue_empty
    THEN P_first_cell=P_cell
    P_last_cell=P_cell
    ELSE IF exclude_cell (P_cell)
    THEN IF P_end_of_frame=(P_last_cell)
      /*both are valid implicitly*/
      THEN P_end_of_frame=P_cell
      ELSE P_end_of_frame=invalid
    next_cell (P_last_cell)=P_cell)
    P_last_cell=P_cell
    IF end_of_frame (P_cell)
    /*cell with identifier P_cell is the last cell of the frame*/
    THEN P_end_of_Frame=P_cell In the procedure append_cell (P_cell), a check is first carried out to see whether the cell having the identifier P_cell is to be removed in any case. Potentially, the procedure discard_cell (P_cell) is called. Otherwise, a check is carried out to see whether the waiting list is empty. If it is, the identifier of the cell is entered in the variables P_first_cell and P_last_cell. When the waiting list was not empty, a check is carried out to see whether the cell is to be protected against removal in any case because, for example, it is an OAM cell. When this cell is to be protected in every case, either the identifier of the cell is entered in the variable P_end_of_frame (when the identifier of a last frame cell was previously entered in the variable) or the value "invalid" is otherwise entered. When the cell with the identifier P_cell is itself a last frame cell, its identifier is entered in the variable P_end_of_frame. In order to attach the cell to the waiting list, a pointer connection to the attached cell is produced regardless of the previous status of the waiting list and regardless of the nature of the cell to be inserted, and the identifier of the cell is entered in the variable P_last_cell.

The procedure extract_cell is described by the following algorithm in the exemplary program:

IF NOT (queue_empty)

THEN IF P_first_cell=P_endd_of_frame
    THEN P_end_of_frame=invalid
    remove cell identified by P_first_cell from queue for further use
    And retrieve storage
    P_first_cell=next_cell (P_first_cell)

According to the procedure extract_cell, the first cell of the waiting list is taken—when the waiting list is not empty—for further processing, particularly transmission, from the waiting list. A check is thereby carried out to see whether the first cell is a matter of a last frame cell or, respectively, a matter of an individual cell entered in the variable P_end_of_frame. In this case, the value "invalid" is entered in the variable P_end_of_frame, since, following the removal of the first cell, a corresponding cell is then no longer located in the waiting list. In particular, a last frame cell is then no longer in the waiting list. A removal of cells from the waiting list is then not possible until a last frame cell and a frame cell of a following frame following thereupon have been attached to the waiting list. The first waiting list cell is removed and the identifier of the next-successive cell in the waiting list is entered in the variable P_first_cell.

The procedure remove_last_frame is described by the following algorithm in the exemplary program:

```
IF      NOT
        (queue_empty OR
        (P_end_of_frame = invalid) OR
        (P_end_of_frame = P_last_cell))
        /*last frame can be removed*/
THEN    P_last_cell = P_end_of_frame
        LPD_flag = TRUE
        retrieve storage starting at cell with identifier
        next_cell (P_last_cell)
        Three conditions are initially interrogated in the procedure:
        is the waiting list empty?
        is the value "invalid" entered in the variable P_end_of_frame?
        is the same identifier entered in the variable P_end_of_frame
        and in the variable P_last_cell?
```

When all three questions are answered with no, all cells of the frame that is the frame beginning farthest toward the back in the waiting list are removed from the waiting list. This is achieved in a simple way in that the same value that is entered in the variable P_end_of_frame is entered in the variable P_last_cell. Either the value of a last frame cell or of an individual cell following such a cell thus resides in these two variables. Further, the boolean variable LPD_flag is set to the value TRUE in order to remove following ATM cells of the frame at their arrival at the waiting list up to and including the last ATM cell of the frame. The memory space occupied by the removed cells is released.

In conclusion, the advantages of the method LPD are again summarized:

complete frames can be removed

Space is created as fast as possible in a waiting list in that all cells of a frame already in the waiting list are removed from the waiting list either simultaneously or in immediate succession.

The furthest cells of the frame up to the last frame cell are removed immediately when they arrive at the waiting list.

The removal of the cells from the waiting list is independent of the arrival of cells at the end of the waiting list. In order to obtain this advantage, only two additional variables are required, namely P_end_of_frame and LPD_flag. Dependent on the type of method that LPD replaces, however, one variable can also be eliminated under certain circumstances. For example, a variable EPD_flag is not required, this indicating whether the method EPD (early packet discard) is activated.

Particularly individual cells that are not to be removed from the ATM communications device under any circumstances are effectively protected against removal.

In the described exemplary embodiment, a computer program for administering a sequence of ATM cells of a weighting list manages with a minimum of operations when ATM cells are removed from the waiting list. New values are only entered in two variables, namely P_last_cell and LPD_flag, and the corresponding memory space is released. The release of the memory space can thereby be particularly implemented step-by-step when free calculating time is available. The system is thus available for further cell operations within the shortest possible time.

Although other modifications and changes may be suggested by those skilled in the art, it is the intention of the inventors to embody within the patent warranted hereon all changes and modifications as reasonably and properly come within the scope of their contribution to the art.

We claim:

1. A method for removing asynchronous transfer mode (ATM) cells from a waiting list, the method comprising:
   storing a last cell identifier that identifies a last ATM cell in the waiting list, the last cell identifier corresponding to a back of the waiting list;
   storing an end-of-frame identifier that corresponds to an end of a target frame in the waiting list, the target frame comprising ATM cells, the end-of-frame identifier being stored in association with a non-frame ATM cell that follows the target frame in the waiting list; and
   removing all ATM cells of an other frame located at a back of the waiting list up to the end-of-frame identifier, the back of the waiting list being identified using the last cell identifier.

2. The method of claim 1, wherein the ATM cells are removed from the other frame beginning farthest toward the back of the waiting list and proceeding to the end-of-frame identifier.

3. The method of claim 1, wherein the ATM cells are removed upon arrival or following arrival at the waiting list.

4. The method of claim 1, wherein a first ATM cell of the other frame is immediately preceded by an ATM cell frame that is identified by the end-of-frame identifier.

5. The method of claim 4, wherein the ATM cell that is identified by the end-of-frame identifier comprises an operation, administration, maintenance (OAM) cell or a resource management (RL) cell.

6. The method of claim 1, further comprising:
   performing a check at, or following, attaching an arrived ATM cell to an end of the waiting list to determine whether the arrived ATM cell is a last cell of frame; and
   as warranted, storing a value that identifies the arrived ATM cell accordingly.

7. A method for removing ATM cells from a waiting list, the method comprising:
   labeling a non-frame ATM cell in the waiting list as an end-of-frame ATM cell in order to prevent the non-frame ATM cell from being removed from the waiting list; and
   removing all ATM cells of an other frame located at a back of the waiting list up to the end-of-frame ATM cell, the back of the waiting list being identified via a predefined pointer.

8. The method of claim 7, wherein the non-frame ATM cell is labeled upon arrival of the non-frame ATM cell at the waiting list or when the non-frame ATM cell is added to the waiting list.

* * * * *